US006344237B1

(12) United States Patent
Kilmer et al.

(10) Patent No.: US 6,344,237 B1
(45) **Date of Patent: *Feb. 5, 2002**

(54) METHOD OF DEPOSITING FLUX OR FLUX AND METAL ONTO A METAL BRAZING SUBSTRATE

(75) Inventors: Raymond J. Kilmer; John B. Eye, both of Lancaster, PA (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/517,908

(22) Filed: Mar. 3, 2000

Related U.S. Application Data

(60) Provisional application No. 60/122,947, filed on Mar. 5, 1999, and provisional application No. 60/169,966, filed on Dec. 9, 1999.

(51) Int. Cl.[7] .......... B05D 1/02

(52) U.S. Cl. .......... 427/190; 427/191; 427/192; 427/201; 427/427

(58) Field of Search .......... 427/190, 191, 427/192, 201, 475, 215–217, 421, 427; 148/528, 537

(56) References Cited

U.S. PATENT DOCUMENTS

| | | | | | |
|---|---|---|---|---|---|
| 3,667,111 | A | | 6/1972 | Chartet | 29/495 |
| 3,914,507 | A | * | 10/1975 | Fustuhian | |
| 3,951,328 | A | | 4/1976 | Wallace et al. | 228/207 |
| 4,505,946 | A | * | 3/1985 | Suzuki et al. | |
| 4,556,165 | A | | 12/1985 | Yamawaki et al. | 228/223 |
| 4,571,352 | A | | 2/1986 | Aoki | 427/431 |
| 4,723,597 | A | | 2/1988 | Sonoda | 165/133 |
| 4,732,311 | A | | 3/1988 | Hasegawa et al. | 228/138 |
| 4,781,320 | A | | 11/1988 | Fujiyoshi | 228/183 |
| 4,831,701 | A | | 5/1989 | Yutake | 29/157.3 R |
| 4,901,907 | A | | 2/1990 | Enokido et al. | 228/183 |
| 4,989,775 | A | | 2/1991 | Shimajiri et al. | 228/218 |
| 5,042,574 | A | | 8/1991 | Cottone et al. | 165/133 |
| 5,100,048 | A | | 3/1992 | Timsit | 229/198 |
| 5,100,486 | A | | 3/1992 | Krikorian et al. | 148/248 |
| 5,102,032 | A | | 4/1992 | Cottone et al. | 228/183 |
| 5,174,490 | A | | 12/1992 | Koisuka et al. | 228/183 |
| 5,180,098 | A | | 1/1993 | Halstead et al. | 228/183 |
| 5,190,596 | A | | 3/1993 | Timsit | 148/23 |
| 5,217,747 | A | | 6/1993 | Tsantrizos et al. | 427/455 |
| 5,232,788 | A | | 8/1993 | Timsit et al. | 428/560 |
| 5,240,742 | A | * | 8/1993 | Johnson et al. | |
| 5,242,669 | A | | 9/1993 | Flor | 423/465 |
| 5,277,358 | A | | 1/1994 | Cottone et al. | 228/219 |
| 5,302,414 | A | * | 4/1994 | Alkhimov et al. | |
| 5,305,945 | A | | 4/1994 | Cottone et al. | 228/183 |
| 5,316,863 | A | | 5/1994 | Johnson et al. | 428/548 |
| 5,322,209 | A | | 6/1994 | Barten et al. | 228/183 |
| 5,330,090 | A | | 7/1994 | Iwai | 228/56 |
| 5,418,072 | A | | 5/1995 | Baldantoni et al. | 428/558 |
| 5,547,517 | A | | 8/1996 | Iwai | 148/24 |
| 5,549,239 | A | | 8/1996 | Morley et al. | 228/207 |
| 5,594,930 | A | | 1/1997 | Terada et al. | 419/5 |
| 5,755,374 | A | | 5/1998 | Prigmore | 228/183 |
| 5,771,962 | A | | 6/1998 | Evans et al. | 165/133 |
| 5,785,770 | A | | 7/1998 | Meshri et al. | 148/26 |
| 5,795,626 | A | * | 8/1998 | Gabel et al. | |
| 5,820,939 | A | | 10/1998 | Popoola et al. | 427/449 |
| 6,012,511 | A | | 1/2000 | Shinmura et al. | 165/133 |

FOREIGN PATENT DOCUMENTS

| | | | |
|---|---|---|---|
| DE | 3003045 | | 7/1981 |
| DE | 3836585 | | 5/1989 |
| EP | 0605323 | | 7/1994 |
| EP | 0869198 | | 10/1998 |
| EP | 1004386 | | 5/2000 |
| EP | 1004390 | | 5/2000 |
| FR | 2460175 | | 1/1981 |
| JP | 63132767 | | 6/1988 |
| WO | WO 94/29072 | * | 12/1994 |
| WO | 94/29072 | * | 12/1994 |
| WO | 9831850 | | 7/1998 |

* cited by examiner

*Primary Examiner*—Fred J. Parker
(74) *Attorney, Agent, or Firm*—Charles Q. Buckwalter; Julie W. Meder; Edward L. Levine

(57) ABSTRACT

The present invention is directed to a means for the surface preparation of a metal or metal alloy substrate. In the process of the present invention, a stream of a mixture of flux particles and metal particles is hurled at the substrate at velocities effective for flux adhesion to the surface. The velocities of the particle stream is adjusted so that the flux particles adhere to the surface and the metal particles bounce off the surface. At higher temperatures and velocities, the metal particles are co-deposited with the flux.

29 Claims, 4 Drawing Sheets

(4 of 4 Drawing Sheet(s) Filed in Color)

METHOD OF DEPOSITING FLUX OR FLUX AND METAL ONTO A METAL BRAZING SUBSTRATE

RELATED APPLICATIONS

This application claims the benefit of U.S. Provisional Application Ser. No. 60/122,947 filed Mar. 5, 1999, entitled "Fluxing Metal and Metal Alloys at Ambient Temperatures" and U.S. Provisional Application Ser. No. 60/169,966 filed Dec. 9, 1999, entitled "A Method of Increasing the Adhesion of Flux on Brazing Sheet".

FIELD OF THE INVENTION

The present invention relates to a method for joining together two or more metal articles by brazing. More particularly, the present invention relates to methods for depositing a flux material with or without metal powders onto a metal substrate prior to a brazing operation.

BACKGROUND OF THE INVENTION

Aluminum and its alloys are particularly useful materials for inclusion in metal components of vehicles such as cars, trucks, airplanes, and the like. Aluminum alloys are lighter than steel alloys and thus offer weight advantages in many applications in vehicles. The light weight and excellent heat transfer properties of aluminum alloys make them particularly attractive candidates for use in heat exchangers such as radiators, heaters, evaporators, oil coolers, condensers and the like. These heat exchangers and similar components are typically fabricated from a multitude of formed or extruded parts that are subsequently assembled, fixtured, cleaned and joined together in a brazing process. In brazing of aluminum work pieces, an aluminum brazing alloy (e.g., an aluminum-silicon alloy) is positioned between the surfaces to be joined and the work pieces are heated to a temperature which melts the brazing alloy but not the underlying work piece. Upon cooling, the brazing alloy solidifies as a joint between the work pieces. The brazing alloy is typically introduced onto the surfaces of aluminum stock by cladding thereto in a roll bonding operation.

A common brazing practice includes cleaning of the components via a suitable solvent (to remove oils and the like from the surfaces to be brazed) followed by application of a flux to the pre-brazed components to be joined. The fluxed components are heated in a controlled atmosphere to retard oxidation, this atmosphere being typically dry nitrogen. The role of the flux is to reduce the oxides on the faying surfaces of the components which are to be joined via brazing. The flux is applied after fabrication of the individual work pieces to be brazed, commonly after assembly of the components (e.g. as a heat exchanger) prior to brazing. The flux may be applied directly as a dry powder or mixed with a carrier such as water or alcohol and applied as a slurry over the entire work piece. In the latter case, the carrier is subsequently removed via a drying step, leaving the flux as a powder on the surface of the work piece.

The flux is only required in areas where metallurgical bonds or joints are required. Nevertheless, it is common manufacturing practice to apply flux over the entire assembly, often including the fixtures used to contain the parts during the brazing step in the furnace. This results in overuse and waste of flux, the need to clean the fixtures and increased maintenance of the furnace due to the corrosive nature of flux. Moreover, the processes of cleaning and applying flux are time consuming and concomitantly expensive. It should be further noted that the flux is loosely adhered to the work pieces as a powder. Hence, care must be taken to avoid removal of the flux during any handling of the components prior to brazing.

An alternative to fluxing the entire assembly is to apply flux to the work pieces prior to working or forming the material in a pre-fluxing operation. Pre-fluxing is advantageous in that the flux can be applied only on the cladding where joints are formed; unclad areas are without flux. However, conventional pre-fluxing techniques have not found broad commercial applications.

One pre-fluxing method has been to disperse flux in a binder and coat the work piece with the flux-binder mixture. During brazing, the binder volatilizes which may results in undesirable voids within the joint that must be filled to ensure sealing of the brazed components. Another drawback to this flux-binder coating technique is that the brazing surfaces typically must be cleaned beyond standard rolling mill cleanliness standards thereby increasing the operating costs by several cents per pound of brazing metal produced.

An alternative route to pre-fluxing is to eliminate the cladding process and apply flux and a cladding metal or alloy in deposition processes either simultaneously or sequentially. One such technique is thermal spraying as disclosed in U.S. Pat. No. 5,594,930. The '930 patent teaches spraying molten droplets of aluminum and silicon or an alloy thereof onto a brazeable aluminum substrate. U.S. Pat. No. 5,820,939 also discloses a method of thermally spraying metallic coatings on unroughened cleaned aluminum alloy substrates. The method includes wire-arc thermally spraying of melted metallic bonding droplets and fluxing particles onto the substrate using gas propulsion to concurrently deposit flux particles and bonding droplets. In these methods, molten droplets pass through air and form additional oxides thereon which compounds the need to deoxidize the substrate.

Hot pressing of powders of aluminum, silicon or an alloy or mixture thereof onto an unclad aluminum substrate is described in U.S. Pat. Nos. 5,330,090 and 5,547,517. Compaction of powders typically results in minimum void levels of about ten percent. Voiding is undesirable and the process of hot pressing the powders onto the substrate can be cumbersome.

Coating processes for simultaneous application of flux with aluminum and silicon are described in U.S. Pat. Nos. 5,100,048 and 5,190,596. The '048 patent teaches a process of dipping unclad aluminum substrate into an alcohol slurry of aluminum, silicon and flux. Upon evaporation of the alcohol, the silicon and flux remaining on the substrate is weakly adhered thereto and tends to spall off the substrate during assembly. The '596 patent discloses a method of applying a paste containing aluminum, silicon and a binder onto unclad aluminum substrate. In either case, the silicon and aluminum form a thin clad layer on the aluminum substrate and a flux is incorporated therewith. This system adheres better to the substrate, but the volatilized binder creates voids in the joint.

Accordingly, a need remains for a method of depositing brazing flux onto metal substrates prior to working of the metal which minimizes the amount of flux used in the brazed assembly, adheres flux to the substrate without the use of a binder, and may additionally deposit metal cladding into the substrates.

SUMMARY OF THE INVENTION

This need is met by the method of the present invention which includes a method of treating a surface of a metal article, a metal substrate, by spraying a treating composition including metal halide particles dispersed in a carrier gas onto a surface of a metal article at a sufficiently high velocity to form a layer of the metal halide particles on the surface. The minimum velocity for deposition of the metal halide particles is about 100 m/sec. This technique is particularly useful for pre-fluxing brazing components. The gas may be air, helium, nitrogen or combinations thereof and may have a temperature of about room temperature to about 500° C. The type of gas and the treating composition temperature may be varied to control the velocities of the particles entrained in the gas of the treating composition. Less dense gas (e.g. helium), higher temperatures and higher pressures provide higher particle velocities.

Another set of particles, preferably formed from a metal, an alloy thereof or a mechanical mixture of a metal and an alloy thereof, may also be dispersed in the gas. Hereinafter, reference to a metal as the material of a substrate, particle or coating is meant to include the metal, alloys thereof as well as mechanical mixtures of metals and metal alloys unless otherwise indicated. The metal or metal alloy particles are believed to assist in deposition of the metal halide particles onto the surface of the metal article. The metal halide particles and the metal particles preferably are each about 5 to about 50 $\mu$m in diameter. The velocity of the particles sprayed onto the surface of the metal article being treated determines whether the metal halide particles alone are deposited onto the surface or whether the metal halide particles and the metal particles are co-deposited onto the surface. In one embodiment, the velocity of the particles is selected so that only the metal halide particles are incorporated into the surface of the article while the metal particles recoil or bounce off from the surface and are not incorporated into the article. When the treating composition is sprayed at velocities of about 200 to about 550 m/sec, a layer of metal halide particles is deposited onto the metal surface in the amount of about 1 to about 12 grams per square meter of the surface.

In another embodiment, the treating composition is sprayed at a velocity whereby both of the metal halide particles and the metal particles are incorporated into the surface of the article. A higher velocity of the treating composition is needed than for incorporating only the metal halide particles into the article surface which preferably is over about 550 m/sec. This embodiment results in a layer of metal halide on the surface of the metal article and also creates a clad layer of the metal particles.

The method of the present invention may be used to treat metal articles formed from aluminum alloys, copper alloys, steel alloys, magnesium alloys, and nickel alloys. Suitable aluminum alloys are those of the Aluminum Association 1xxx, 2xxx, 3xxx, 4xxx, 5xxx, 6xxx, 7xxx or 8xxx series. The present invention is particularly suited for producing pre-fluxed brazing sheet which is either clad or unclad. Unclad brazing sheet may be fluxed and clad in a single process using the method of the present invention.

In yet another embodiment of the invention, the metal halide particles may be encapsulated with a metal such as Al, Cu, Zn, Mg, M, Ni, In, Li or Fe. The metal coating over the metal halide particles provides for a metal-to-metal adhesion of the encapsulated particles to the substrate. Other particles, including those which otherwise traditionally exhibit poor adhesion to metal substrates, such as particles of a transition metal (e.g. silicon or silicon alloys), may be encapsulated in these metals and may be deposited as well. These encapsulated particles provide an opportunity to apply flux and a clad layer to brazing sheet with superior adhesion properties.

BRIEF DESCRIPTION OF THE DRAWINGS

The patent or application file contains at least one drawing executed in color. Copies of the patent or patent application publication with color drawings will be provided by the U.S. Patent and Trademark Office upon request and payment of the necessary fee.

Other features of the present invention will be further described in the following related description of the preferred embodiments which is to be considered together with the accompanying drawings wherein like figures refer to like parts and further wherein.

DESCRIPTION OF THE PREFERRED EMBODIMENTS

Figure 1:
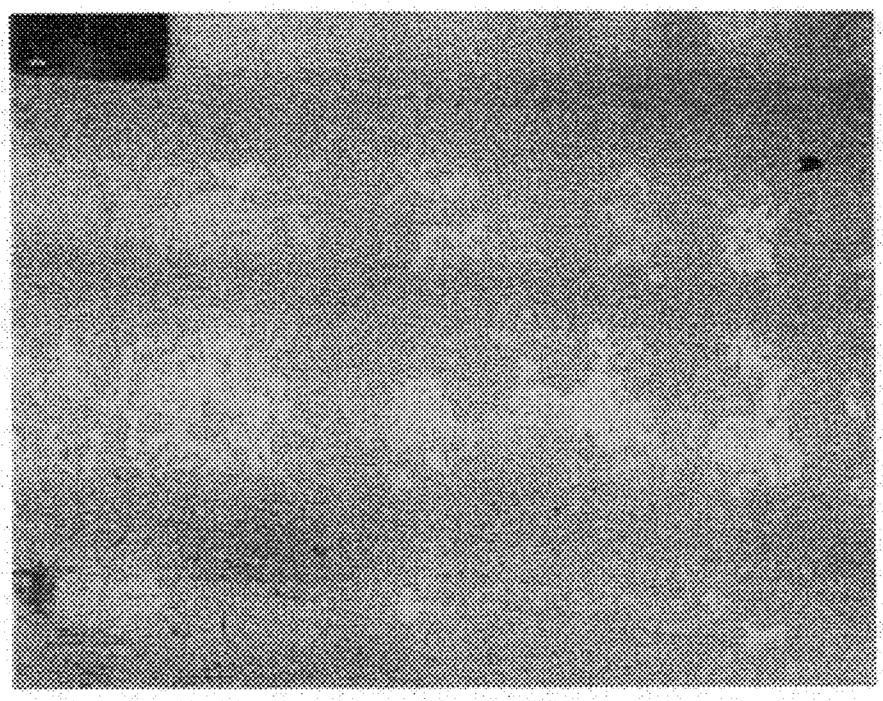
FIG. 1 is a ten times magnified photomicrograph of the aluminum coupon coated in Example 1.

This need is met by the method of the present invention which includes a method of coating the surface of a metal substrate with a stream of a treating composition containing metal halide particles (flux, an inorganic fluoride salt) and/or metal particles which is sprayed onto the metal substrate at velocities sufficient to result in adhesion to the substrate of the halide particles or both the halide particles and the metal particles. The particle stream and resultant coating may comprise 1) metal halide particles alone, 2) a mechanical mixture of metal halide particles and other particles formed from a metal or 3) flux particles and/or transition metal particles encapsulated within a metal or metal alloy shell.

In a first embodiment of the invention, the treating composition includes flux particles. The treating composition is sprayed at particle velocities which result in coating of the flux particles onto the metal surface, preferably at over about 100 to about 1200 m/sec. The resultant coating is purely comprised of flux, preferably in amounts of about 1 to about 12 g per square meter of metal surface.

In a second embodiment, the treating composition includes flux particles and other particles. The other particles may be formed from metals, metal alloys, ceramics, cermets, polymers or mixtures thereof, with metals or metal alloys being particularly preferred. The flux particles and the other particles both preferably range from about 5 to about 50 $\mu$m in diameter. The ceramic particles may be formed from SiC, $Si_3N_4$, $Al_2O_3$, cubic boron nitride or combinations thereof.

The velocity of the treating composition determines whether the flux particles alone are deposited on the metal surface or whether the flux particles and the other commingled particles are deposited on the metal surface. It is believed that the other particles, particularly when formed of metal, clean and roughen the metal surface being coated and also strike and drive the flux particles onto the surface. A coating of flux alone is obtained when the velocities of flux particles within the treating composition stream are above the critical velocity therefor (greater than about 100 m/sec) but below the critical velocity of the other particles (typically about 550 m/sec or less for metals and metal alloys). The critical velocity is defined as the minimum velocity required for adhesion of a specific material to a specific substrate. The other particles bounce off the substrate and can be recycled for re-use in applying another coating of the flux particles. In certain circumstances the resultant adhesion of a flux coating prepared by intermixing with other particles may be superior to a flux coating prepared by directing flux particles alone onto the underlying substrate. The ratio of volume percent of flux to volume percent of other particles in the treating composition can be widely varied depending on the coating application rate, cleanliness of the substrate and other such operating parameters and may be about 5:95 to about 95:5.

Alternatively, the second embodiment may be used to deposit a coating of flux particles and metal particles simultaneously onto the underlying substrate when the critical velocities of the metal particles are exceeded (typically over 550 m/sec or greater). As detailed above, the metal intermixed with the flux may be pure metal, metal alloys or mechanical mixtures thereof. It should be recognized that the particle velocities achieved within the particle stream are a function of individual particle density, shape and size. Hence, a distribution of particle velocities is present within the particle stream. The incorporation of metal and flux into a coating may be particularly desirable when the metal can be used for cladding material in the brazing process.

In a third embodiment of the invention, the treating composition includes gas entrained flux particles encapsulated in a metal or metal alloy which is likewise sprayed onto the substrate at velocities sufficient to result in adhesion of the encapsulated flux to the substrate. The presence of an outer metal/metal alloy shell over the flux improves the deposition efficiency of the process (the deposition efficiency being the ratio of particles that adhere to the total number of particles directed onto the substrate). The amount and type of metal (or metal alloy) encapsulating the flux may be varied. Examples of suitable encapsulating metals include Al, Cu, Zn, Mg, Mn, Ni, In, Li or Fe. In a particularly desirable embodiment, the metal encapsulated flux can be mixed with particles of silicon or silicon alloy and deposited to form a coating on aluminum alloys. The deposition efficiency of the silicon or silicon alloy particles can also be improved by encapsulation thereof with a metal or metal encapsulated silicon or silicon alloy. The metal-coated flux and silicon or metal-coated flux and metal-coated silicon interact with the underlying aluminum substrate to create a molten cladding within the furnace during a brazing cycle. In this embodiment the encapsulated powders are typically sprayed at velocities over about 400 m/sec.

The present invention utilizes a coating technique similar to that detailed in U.S. Pat. Nos. 5,302,414 (the '414 patent) and 5,795,626 the disclosures of which are incorporated herein by reference. The '414 patent discloses an apparatus and process for spraying metal, metal alloy, polymer or a mechanical mixture of a metal and an alloy onto a substrate at supersonic velocities, thereby coating the surface of the substrate with whatever material is entrained in the flow. When polymer is sprayed onto the substrate, the '414 patent indicates that a subsequent polymerization (heating) step is required to adhere the polymer to the substrate. The result of this rigorous treatment of the surface is a coating of the particles bonded to the substrate. Each of the embodiments of the present invention utilizes the same basic method of spraying of particles onto a surface to form a coating thereon. However, in the present invention, the metal halide (an ionic salt or mixture of ionic salts) is deposited onto a metal substrate. Whereas metal or metal alloy particles may freely share electrons for bonding to the metal substrate, ionic salts (e.g. flux) do not. Despite this incapacity, flux has been found to adhere to metal substrates when sprayed thereon at velocities greater than about 100 m/sec.

Control of the particle velocity is integral to the present invention so that the desired particle is deposited, particularly when multiple types of particles are present in the treating composition. The particle velocity is affected by numerous factors including the geometry of the spraying nozzle, particle density, particle shape, particle size, gas type, gas temperature, and gas pressure.

The velocity of the particles is affected in part by the design of the equipment used to spray the treating composition. A preferred apparatus is a converging—diverging type nozzle that compresses the gas and entrained particles through a minimum throat and then expands and accelerates the gas and entrained particles to high velocities. The internal dimensions of the nozzle can influence the velocity of the particles. In general, a longer converging-diverging nozzle, results in faster particle velocities. The stand off distance (nozzle to substrate) is not especially critical and may be about one to five inches. At this distance, the resultant spray stream has a certain cross-sectional area. The velocity of the particles in the cross-sectional area is not uniform. In general, the particles move more slowly around the periphery of the spray cross-section. As a result, the particles around the periphery of the metal surface may not achieve critical velocity for adhesion. Advantageously, these slower particles serve to abrade and clean the surface immediately ahead of the portion of the spray cross-section which is flowing at or above the critical velocity. This can obviate the need for cleaning the substrate prior to fluxing and brazing.

The particle density is inherent to the material used. The particle size is preferably about 5 to about 50 $\mu$m. The supersonic flow of the treating composition against the substrate develops a shock wave at the substrate surface. Small particles, i.e. less than about 5 $\mu$m typically cannot pass therethrough and never reach the substrate. These small particles create waste and may contaminate the spraying apparatus and environs. Hence it is desirable to use particles which are larger than 5 $\mu$m in diameter. Larger particles move slower than smaller particles, hence there is an upper limit for the particles used in the present invention which will experience supersonic flow. This upper limit is preferably about 50 $\mu$m. The particles used in the present invention may be in the form of powders or flakes, with powders being preferred.

The gas pressure, gas temperature and gas type used in the present invention influence the velocity of the gas and hence the velocity of the entrained particles within the gas stream. The higher the gas pressure and temperature, the greater the resultant velocities. As gas densities decrease, the gas velocities increase through the converging-diverging nozzle. Hence, the use of helium or a mixture of helium and air (for a given gas temperature and pressure) will result in higher gas velocities than the use of air alone. The preferred gases are air, nitrogen, helium and mixtures thereof. Helium is significantly more expensive than air or nitrogen, therefore if helium is used, it is preferred to recycle the gas. If the gas is not recycled, air or nitrogen is preferred. An explosion potential exists when handling metal powders; the selection of the composition of the particles and the composition of the gas can be critical from a safety perspective. Inert gases such as helium and nitrogen are advantageous with regards to minimizing the explosion potential. Economics as well as safety influence the selection of gas type, pressure and temperature. Air, nitrogen and recycled helium all may be potentially justifiable from an economic perspective. It also should be noted that increasing the gas temperature can be more effective at increasing particle velocities than increasing the gas pressure although both nonlinearly increase the particle velocities.

The method of the present invention is suited for coating metal articles with flux of flux and a clad layer for brazing purposes. The coatings may be applied to metal substrates such as aluminum alloys, copper alloys, steel alloys, magnesium alloys and nickel alloys. Aluminum or aluminum alloys registered with the Aluminum Association and any unregistered variants of the same may be treated according to the method of the present invention. These include but are not limited to the 1xxx, 2xxx, 3xxx, 4xxx, 5xxx, 6xxx, 7xxx, and 8xxx series aluminum alloys and any of the international association registrations not included thereunder. Preferred metal alloys are typically referred to as brazing sheet and are typically multilayer composites of 3xxx, 7xxx, 2xxx and 6xxx series alloys, which may be clad with a 4xxx series alloy. The articles may be extrusions, clad or unclad foil, sheet, slab or plate.

The flux of the treatment composition mixture may be any material capable of removing the oxide layer and which melts below 1080° F. A preferred flux is a complex of potassium fluoroaluminate. As herein used, potassium fluoroaluminate refers to materials containing the elements potassium, aluminum and fluorine, in such proportions that compounds such as KF, $AlF_3$, $KAlF_4$, $K_2AlF_5$, $K_3AlF_6$ either singly, doubly or in combination are present. The composition can be expressed in terms of the elemental composition of 20 to 45% K; 10 to 25% Al, and 45 to 60% F; or in terms of the concentration of the compounds KF and $AlF_3$, as 40 to 70% $AlF_3$ and 30 to 70% KF. These and other suitable fluoroaluminates having the desired flux properties are described in U.S. Pat. No. 5,190,596. One example of a commercially sold potassium fluoroaluminate is NOCOLOK® flux, other potassium fluoroaluminates such as $KAlF_4$, $K_2AlF_5$, $K_3AlF_6$, and their mixtures and potassium fluoroaluminate mixed with one or more of cesium chloride, rubidium chloride, lithium fluoride, cesium fluoride and other alkali halide salts to reduce the melting point of the flux. Other known aluminum brazing fluxes are mixtures of alkali and alkaline earth chlorides and fluorides, ammonium chloride, ammonium fluoride, potassium acid fluoride ($KHF_2$), sodium acid fluoride ($NaHF_2$), ammonium acid fluoride ($NH_4.HF_2$), zinc chloride, mixtures of zinc chloride, potassium acid fluoride and ammonium chloride and potassium fluorozirconate ($K_2ZrF_6$).

The flux coating on a brazing surface may be comprised of discrete islands of flux on the surface of the metal. This deposition technique allows for flux to be adhered to the metal substrate as well as to itself. Accordingly, discrete islands of flux may act as a reservoir of flux. The reservoirs of flux may flow to critical areas of the work piece by gravity or capillary action during the braze cycle. In the practice of brazing, the treated metal work piece is heated to temperatures at which the adhered flux material liquefies and flows providing ample flux for brazing at specific site locations. The adhesion of the coatings created by these embodiments are specifically intended to survive forming operations and thus be supplied as a coating on the incoming metal stock. This does not preclude their use on work pieces already formed. The advantage of supplying the coating on incoming stock precludes the need to flux the work pieces downstream in the process, thus eliminating an entire fabrication step, minimizing the use of flux and guaranteeing the presence of flux on the surfaces to be brazed. It is particularly advantageous for use on work pieces which to date must be fluxed prior to assembly of the component; for example plate type heat exchangers (evaporators, plate type heaters, plate type condensers, intercoolers and oil coolers) and sub-assemblies such as internal baffles in manifolds, brazed one-piece manifolds, two piece manifolds, separators and the like.

The present invention also includes methods of depositing flux onto a clad or unclad metal surface for brazing purposes and methods of simultaneously cladding and depositing flux into a coating on the surface of an unclad metal surface for brazing purposes. Table 1 sets forth these various methods included in the present invention based on the type of particle deposited and the type of metal surface treated.

TABLE 1

| Embodiment | Coating | Substrate | Specific Example |
|---|---|---|---|
| 1 & 2 | Flux only | Clad material | Potassium fluoroaluminate flux coated over clad aluminum brazing sheet |
| 2 | Flux and metal -or- Flux and silicon or silicon alloy -or- Flux and metal encapsulated silicon or silicon alloy | Bare metals (unclad) -or- clad material | Potassium fluoroaluminate flux intermixed with aluminum silicon powder coated over any aluminum alloy |
| 3 | Metal encapsulated flux | Clad material | Potassium fluoroaluminate flux encapsulated within copper coated over clad aluminum brazing sheet |
| 3 | Metal encapsulated flux and metal -or- Metal encapsulated flux and silicon or silicon alloy -or- Metal encapsulated flux and metal encapsulated (silicon or silicon alloy) | Bare metals (unclad) | Potassium fluoroaluminate flux encapsulated within zinc intermixed with silicon coated over any aluminum alloy |

The present invention is well suited for brazing aluminum alloy work pieces, with or without a pre-cleaning step. An aluminum work piece may be brazed according to a method having the following steps: (a) providing an aluminum work piece, the work piece having a brazing surface; (b) providing a treating composition including a gas and brazing flux particles; and (c) spraying the treating composition onto the brazing surface of the work piece at a velocity whereby the brazing flux particles are incorporated into the brazing surface thereby forming a flux coating on the brazing surface; and (d) disposing the flux coated work piece adjacent to another metal work piece and heating the work pieces to form a brazed joint between the work pieces. Notably lacking from this list of steps is a cleaning step to remove oils, dirt and the like from the brazing surface prior to brazing, although cleaning may be performed as desired.

If the aluminum work piece is clad, only flux or flux encapsulated in metal (to enhance adhesion to the clad substrate) need be deposited thereon according to the first embodiment of the invention. A treating composition containing flux may optionally include metal particles in accordance with the second embodiment of the invention to drive the flux into the substrate surface. The velocity of the treating composition sprayed onto the substrate is controlled such that only flux or metal encapsulated flux are deposited on the substrate as described above, i.e. at about 200 to about 550 m/sec. This does not preclude the deposition of flux and metal onto a clad surface to intentionally modify the nominal composition of the braze cladding by further including the metal particles, e.g. by Zn additions to an Al—Si cladding to improve the sacrificial potential of the cladding.

In typical brazing processes, flux is applied to the surface of the metal prior to forming and/or working the work piece. A forming and/or assembly operation may result in a part with complex geometries, which may have areas that are not easily accessible to a traditional post-assembly fluxing operation. Incorporation of the fluxing material into the surface of the aluminum brazing work piece in accordance with the present invention obviates the need for post-assembly accessibility to essential brazing areas requiring flux. Post-assembly fluxing operations apply excess flux to the entire assembly, including fixtures holding the parts together. This practice results in unwanted and detrimental flux residues on areas of the assembly and corresponding fixtures.

Certain forming and/or working operations that are typical in the industry can be optionally applied to the fluxed substrate. Examples of these operations are hot and cold rolling, stamping, laminating, embossing, blanking, roll forming, pressing, hydroforming, and drawing. The substrate material may be heat treated by annealing, solution heat treatments, aging, or quenching either by air or liquid.

After a work piece has been formed, there may be areas of the work piece that would benefit from fluxing but which are not accessible once formed. Additionally, a formed work piece may be of an obtuse form that increases the difficulty of applying flux. Previously, excess flux was applied after forming which often required an additional blow off step downstream to remove excess flux added prior to the brazing step. When the present invention is used, flux may be applied prior to forming and much less flux is applied per work piece (e.g. heat exchanger) than in conventional processes. This results in a product with improved post-brazed cosmetics, opportunities for increased complexities in flux brazed part design and reduced corrosion of the brazing furnace (due to the reduction in the amount of corrosive molten flux present in the furnace). The flux need only be applied at the areas where metallurgical bonds are necessary. Fortunately, the flux flows at the increased temperatures required for brazing. Therefore, the specific location of the flux is not highly critical when the underlying surface of the work piece is treated with the flux using the process of the present invention. While the surface treatment with the flux may result in a discontinuous layer of flux, the layer is substantially uniform in the areas where flux will be needed and is therefore available for purposes of brazing. It will be known approximately where brazing will be required, and the present invention provides an opportunity to enrich certain areas of the article with flux. By the same notion, in certain other areas where brazing is known not to occur, unnecessary fluxing can be avoided.

The advantages of using this type of process to coat substrates for brazing applications are many including (but not limited to) excellent adhesion of the coating without the need for a binder, the ability to coat material with standard mill cleanliness without the need for a pre-coating cleaning step due to cleaning effects at the periphery of the converging—diverging nozzle, and the ability to selectively coat only the areas that need to be joined.

The present invention further includes methods of simultaneously depositing cladding material and brazing flux onto unclad aluminum alloy work pieces. This method includes steps of: (a) providing an aluminum work piece, the work piece having a brazing surface; (b) providing a treating composition including i) a gas, ii) brazing flux particles, and iii) metal particles; (c) spraying the treating composition onto the brazing surface of the work piece at a sufficiently high velocity to incorporate the brazing flux particles and the metal particles into the brazing surface to form a clad metal layer, thereby forming a flux coated work piece with a clad layer of the metal particles adjacent the brazing surface; and (d) disposing the flux coated and clad work piece adjacent to another metal work piece and heating the work piece to form a brazed flux joint between the work pieces. The velocity of the treating composition sprayed onto the substrate is controlled such that the metal particles and flux or metal encapsulated flux are deposited on the substrate as described above, i.e. at over about 550 m/sec. The treating composition may further include transition metal particles (e.g. silicon or silicon alloys or mixtures thereof) and/or metal encapsulated transition metal particles. High velocity (over about 550 m/sec) spraying of particles containing metal and/or silicon or metal coated silicon results in a clad layer thereof in the aluminum substrate which heretofore was produced in a separate cladding process.

Certain alloys which have a nominal composition that are traditionally difficult or impossible to create via traditional roll bonding practices may be achievable using the method of the present invention. These traditionally non-brazeable alloys have insufficient ductility (i.e. less than about 15 percent) to allow for roll bonding. The present invention contemplates cladding of metal substrate without the use of conventional roll bonding processes, and includes a method of treating the surface of an aluminum alloy having a ductility of less than about 15 percent by incorporating metal particles into the surface according to the invention.

An additional benefit of fluxing the metal alloy according to the invention hereof is a means of identifying certain alloy types and coating weights. A problem in this art can be that different alloys and the articles made therefrom have similar appearances and cannot be segregated by visual inspection. By the process hereof, identification markings may be included within the flux material either by color identifying powders or by marking uniquely on the metal alloy itself This then can identify different articles, different sides of the alloy, different coating weights and whether the alloy has been clad or not.

Although the invention has been described generally above, the particular examples give additional illustration of the product and process steps typical of the present invention.

EXAMPLES

Example 1

Flux Sprayed, Flux Deposited

A coupon (2 by 5 inches, 0.019 inch gauge) of an aluminum alloy 4147 was coated with a flux material in accordance with the present invention. The flux was a standard potassium aluminum fluoride flux, Solvay NOCOLOK®. The flux was entrained in nitrogen gas at a flow rate of 200 CFM and pressure of 50 psig. The gas-entrained flux was sprayed on the surface of the aluminum alloy coupon through an axisymmetric converging—diverging nozzle. The nozzle was rastered or moved back and forth across the surface to deposit the flux in rows onto the substrate. The flux coated coupon was worked by bending the coupon 180° around a 3/16 inch diameter rod.

Figure 2:
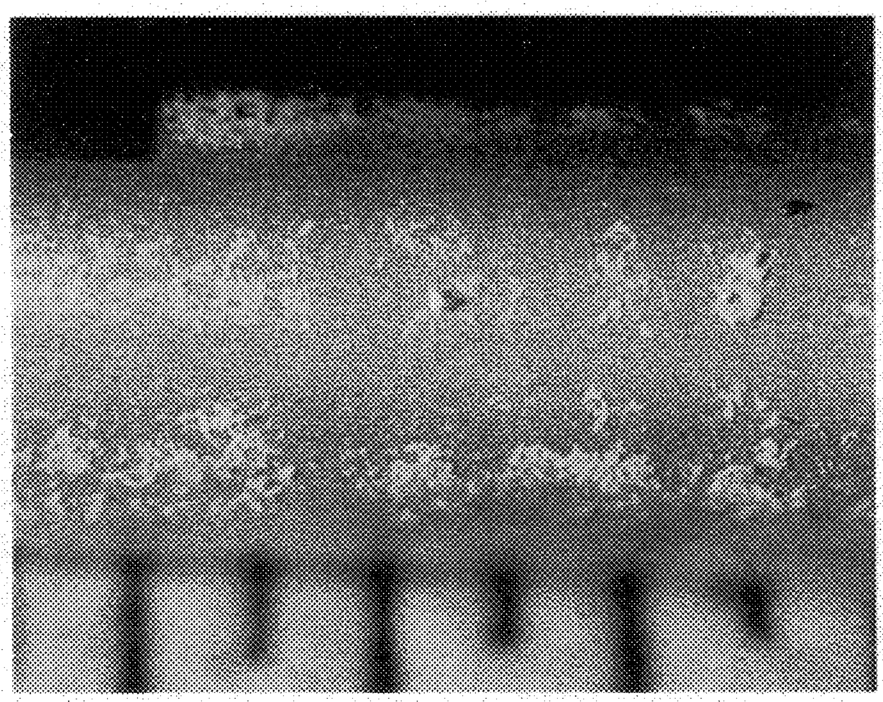
FIG. 2 is a ten times magnified photomicrograph of the aluminum coupon coated in Example 1 after working.

FIG. 1. shows the aluminum coupon after coating. The coating appears as islands of flux as well as larger coated areas of flux. FIG. 2 shows the coupon after working; the flux remains mostly or largely adhered to the surface of the coupon.

Example 2

Flux and Metal Sprayed, only Flux Deposited

A metal alloy coupon, an aluminum alloy 4147 was coated with a flux material in accordance with the present invention. The flux was a mixture of a standard potassium aluminum fluoride flux and aluminum alloy 4047 (which contains 11–13% Si).

The flux was entrained in helium gas at a flow rate of 200 CFM pressure of 50 psig. The gas-entrained flux was delivered to the surface of the aluminum alloy coupon through an axisymmetric converging—diverging nozzle. The nozzle was rastered or moved back and forth across the surface to deposit the flux in rows onto the substrate.

Figure 3:
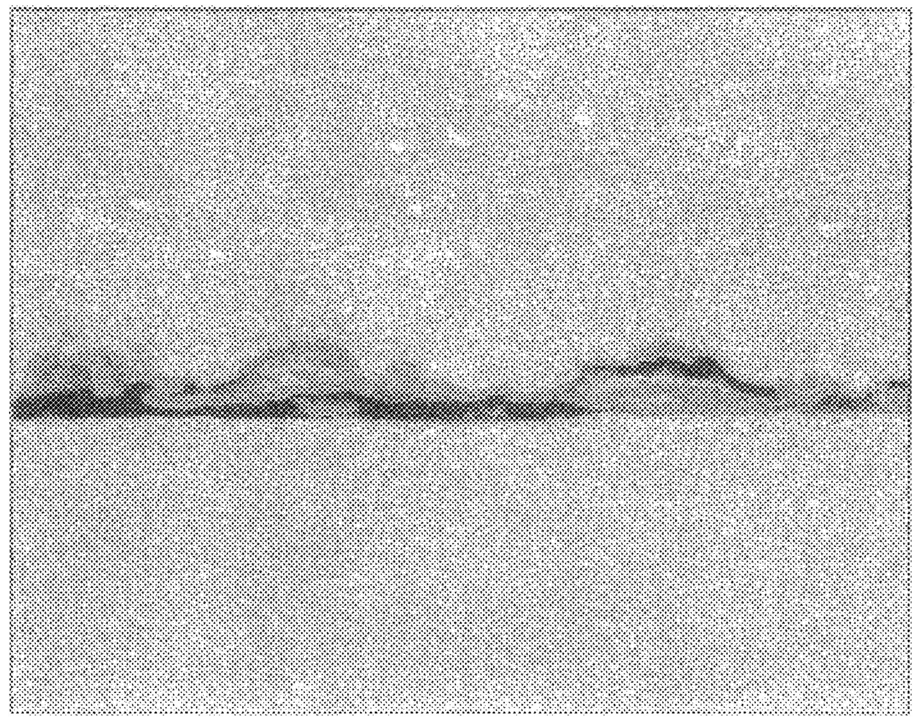
FIG. 3 is a back scattered electron image showing a cross section of the aluminum coupon coated in Example 2.
Figure 4:
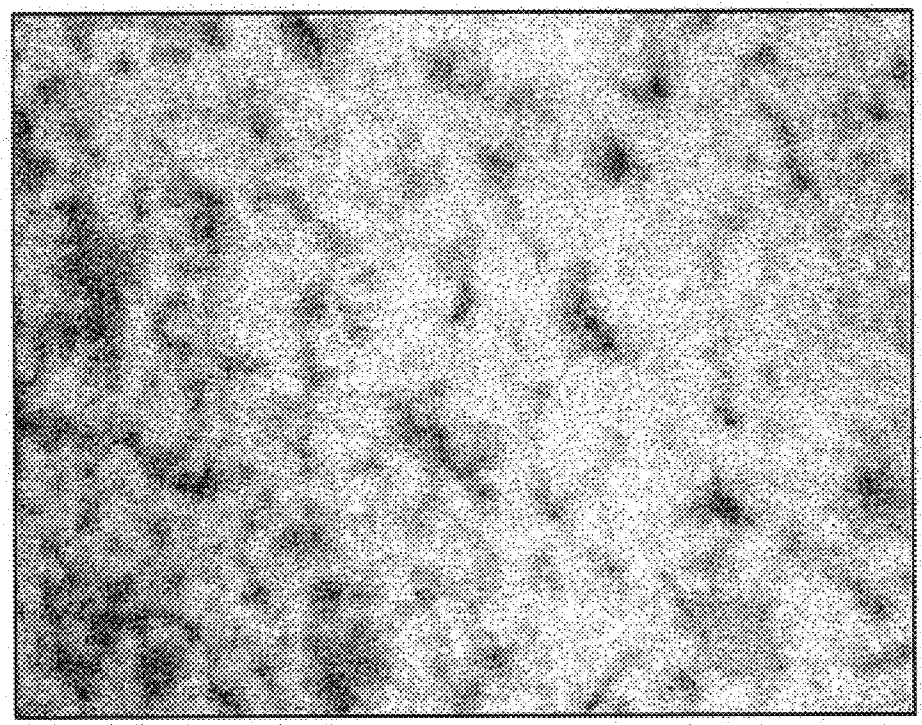
FIG. 4 is an x-ray map of the image of FIG. 3 showing the location and concentration of the element aluminum
Figure 5:
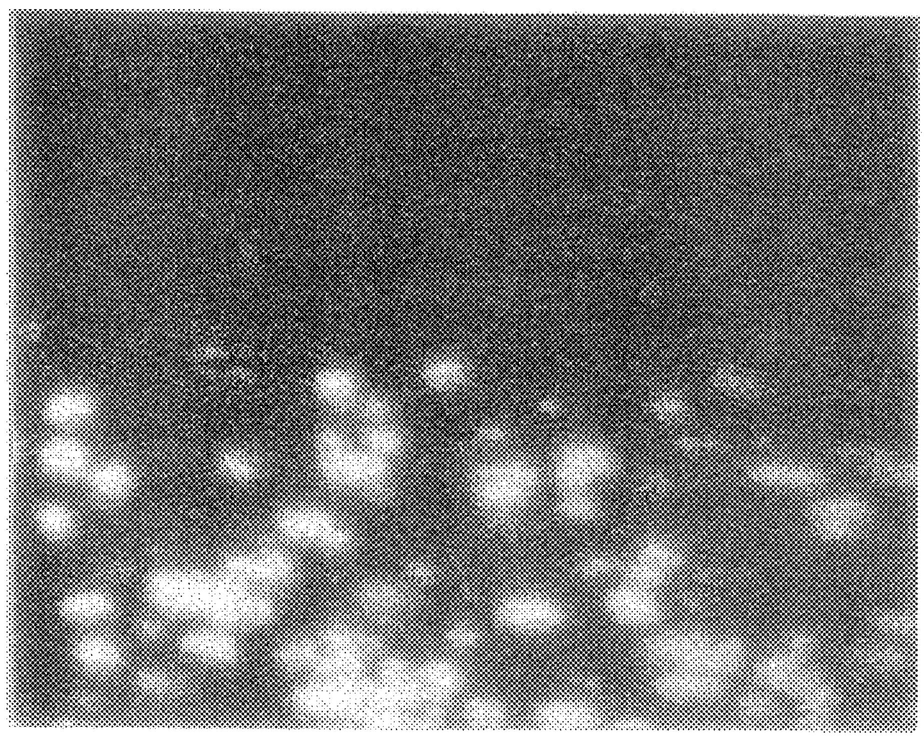
FIG. 5 is an x-ray map of the image of FIG. 3 showing the location and concentration of the element silicon.
Figure 6:
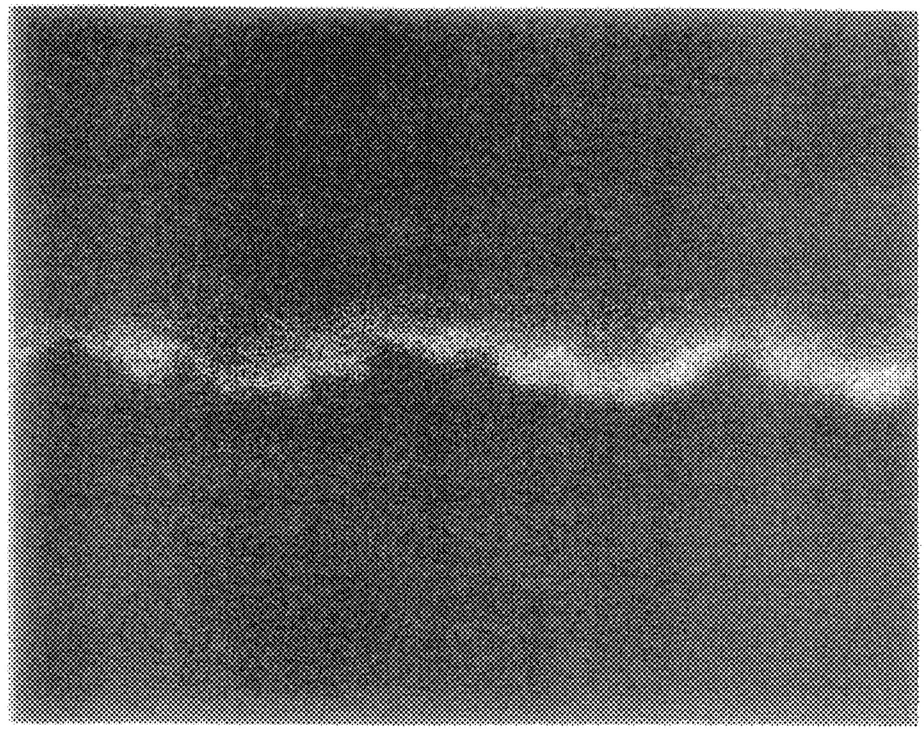
FIG. 6 is an x-ray map of the image of FIG. 3 showing the location and concentration of the element potassium.
Figure 7:
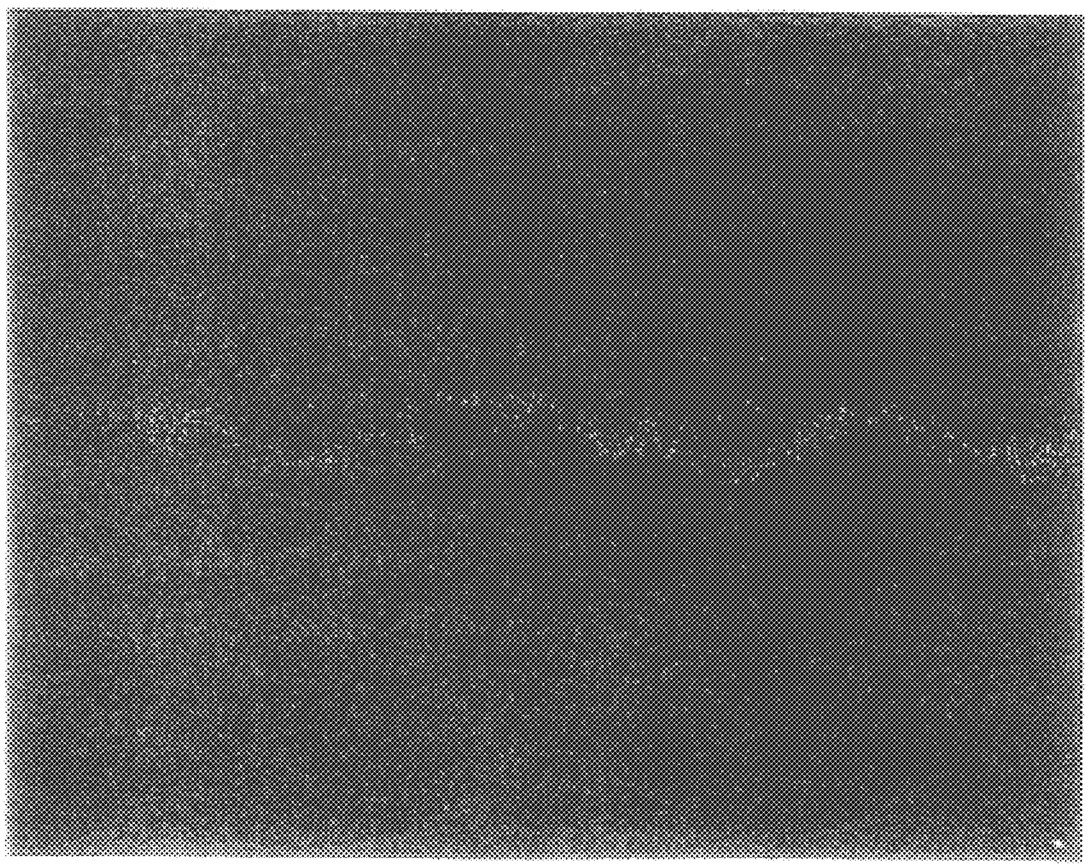
FIG. 7 is an x-ray map of the image of FIG. 3 showing the location and concentration of the element fluorine.

FIG. 3 is a back scattered electron image of a test panel showing the coated substrate in cross section with a blank polishing plate adjacent thereto. The blank polishing plate appears in the lower portion of the image. The panel was tested to determine the level of aluminum (Al) silicon (Si), potassium (K), and fluorine (F) in both the coating and the substrate as shown in FIGS. 4–7.The Al and Si from the cladding appear in FIGS. 4 and 5, respectively. The K and Fl appearing in FIGS. 6 and 7, respectively, are the result of the potassium fluoroaluminate flux layer deposited on the test panel.

There was an absence of Si and Fe in the coating. Silicon and iron are present in the 4047 powder. Apparently, the 4047 powder did not form part of the coating.

It is to be appreciated that certain features of the present invention may be changed without departing from the present invention. Thus, for example, it is to be appreciated that although the invention has been described in terms of a preferred embodiment in which particles of flux and an Al—Si alloy or flux and aluminum are sprayed, the materials contemplated by the present invention to be used with flux include metals, ceramics, transition metals, cermets, semiconductors and polymers. In addition, at lower particle velocities, a broad array of materials could be intermixed with the flux.

Whereas the preferred embodiments of the present invention have been described above in terms of an aluminum silicon alloy substrate, it will be apparent to those skilled in the art that metals suitable for use with the present invention are not limited to aluminum and aluminum alloys. The present invention will also be valuable for applying a flux to any metal or alloy substrate. Other metals substrates such as magnesium, copper, iron, zinc, nickel, cobalt, titanium, and alloys thereof may also benefit from the present invention.

Whereas the preferred embodiments of the present invention have been described above in terms of co-depositing metal particles and flux particles, it is also contemplated that the metal particles may be a pure metal, an alloy, or a mechanical mixture of metals or alloys. Thus the present invention allows for the creation of cladding chemistries that to date could not be extensively rolled due to the inherent brittleness of the cladding material.

Whereas the present invention has been described in terms of a depositing flux, metal may also be deposited. For example, pure Si or a Si—Al alloy may be co-deposited onto a bare aluminum substrate to form a coating which substitutes for traditional near eutectic Al—Si 4xxx series cladding. The resultant claddings made by the present invention also require no additional fluxing step as the flux is incorporated into the product at the time of cladding. In addition, since the present invention is a finishing step, no or limited numbers of rolling passes are required.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

What is claimed is:

1. A method of treating a surface of a metal article comprising the steps of:

a) providing a treating composition including a gas and metal halide particles; and b) spraying the treating composition onto a surface of a metal article at a velocity of over about 100 m/sec to about 1200 m/sec to incorporate a layer of the metal halide particles into the surface.

2. The method of claim 1 wherein the metal halide particles are formed from a potassium fluoroaluminate.

3. The method of claim 1 wherein the step of spraying the treating composition is performed such that the amount metal halide particles deposited is about 1 to about 12 g/m$^2$.

4. The method of claim 1 wherein the gas is selected from the group consisting of air, He, N and mixtures thereof.

5. The method of claim 1 wherein the gas is at a temperature of about room temperature to about 500° C.

6. The method of claim 1 wherein the treating composition further includes other particles, the other particles being formed from a material selected from the group consisting of metals, metal alloys, transition metals, ceramics, cermets, semiconductors, polymers and combinations thereof.

7. The method of claim 6, wherein the other particles are formed from a metal selected from the group consisting of aluminum, silicon, aluminum alloy, silicon alloy and mixtures thereof.

8. The method of claim 6 wherein the ratio of volume percent of the metal halide particles to volume percent of the other particles in the treating composition is about 5:95 to about 95:5.

9. The method of claim 6 wherein the treating composition is sprayed at a velocity whereby the metal halide particles are incorporated into the surface of the article and the other particles are not incorporated into the article.

10. The method of claim 9 wherein the velocity of the treating composition is over about 100 to about 550 m/sec.

11. The method of claim 6 wherein the treating composition is sprayed at a velocity whereby the metal halide particles are incorporated into the surface of the article and the other particles are incorporated into the article.

12. The method of claim 11 wherein the velocity of the treating composition is over about 550 to about 1200 m/sec.

13. The method of claim 6 wherein the metal halide particles and the other particles are about 5 to about 50 μm in diameter.

14. The method of claim 1 wherein the metal article is formed from a composition selected from the group consisting of aluminum alloys, copper alloys, steel alloys, magnesium alloys, and nickel alloys.

15. The method of claim 14 wherein the metal article is formed from an aluminum alloy of the Aluminum Association 1xxx, 2xxx, 3xxx, 4xxx, 5xxx, 6xxx, 7xxx or 8xxx series.

16. The method of claim 15 wherein the metal article is formed from a clad aluminum alloy.

17. The method of claim 11 wherein the metal article is formed from an unclad aluminum alloy.

18. The method of claim 17 whereby a clad layer of the other particles is formed on the aluminum metal article, wherein the clad layer alone has a ductility of less than about 15%.

19. A method of brazing an aluminum alloy work piece comprising the steps of:

a) providing an aluminum work piece, the work piece having a brazing surface;

b) providing a treating composition including a gas and brazing flux particles;

c) spraying the treating composition onto the brazing surface of the work piece at a velocity of over about 100 m/sec to about 1200 m/sec whereby the brazing flux particles are incorporated into the brazing surface thereby forming a flux coating on the brazing surface; and d) disposing the flux coated brazing surface adjacent to another metal work piece and heating the work pieces to form a brazed flux joint between the work pieces.

20. The method of claim 19 wherein the flux composition comprises a metal halide.

21. The method of claim 20 wherein the work piece is formed from an Aluminum Association 3xxx series alloy.

22. The method of claim 19 wherein the treating composition further includes metal particles.

23. The method of claim 22 wherein the treating composition is sprayed at a velocity whereby the metal particles are incorporated into the brazing surface to additionally form a clad layer of the metal particles in the aluminum work piece adjacent the brazing surface.

24. The method of claim 23 wherein the metal particles are formed from a composition selected form the group consisting of aluminum, silicon, aluminum alloy, silicon alloy and mixtures thereof.

25. A method of treating a surface of a metal article comprising the steps of:

a) providing a treating composition including a gas and particles, the particles having a core of a metal halide and a coating of a second material, the second material being a metal or an alloy thereof wherein the gas is at a temperature of about room temperature to about 500° C.; and b) spraying the treating composition onto a surface of a metal article at a sufficient velocity whereby the second material adheres to the surface thereby depositing the metal halide on the surface.

26. The method of claim 25 wherein the second material is a cladding metal selected from the group consisting of Al, Cu, Zn, Mg, Mn, Ni, In, Li and Fe.

27. The method of claim 26 wherein the velocity of the treating composition is sufficiently high to form a layer of the cladding metal in the surface of the metal article.

28. The method of claim 27 wherein the velocity of the treating composition is over about 400 m/sec.

29. The method of claim 28 wherein the metal article is formed from an aluminum alloy.

* * * * *